Patented Sept. 19, 1922.

1,429,504

UNITED STATES PATENT OFFICE.

CHASTAIN G. HARREL, OF LIBERTY, MISSOURI, ASSIGNOR TO THE CAMPBELL BAKING COMPANY, OF WILMINGTON, DELAWARE, A CORPORATION OF DELAWARE.

METHOD OF BLENDING WHEATEN.

No Drawing. Application filed September 6, 1921. Serial No. 498,891.

*To all whom it may concern:*

Be it known that I, CHASTAIN G. HARREL, a citizen of the United States, residing at Liberty, in the county of Clay and State of Missouri, have invented certain new and useful Improvements in Methods of Blending Wheaten; and I do declare the following to be a full, clear, and exact description of the invention, such as will enable others skilled in the art to which it appertains to make and use the same.

This invention relates to a method of controlling the fermentation period of bakery products and particularly bread, rolls and the like through the use of hydrogen ion concentration.

Considerable difficulty is encountered in bakeries to obtain a uniform product from day to day. This is due to the fact that the hydrogen ion concentration in different flours varies so that the period of fermentation of the dough batch for one flour is liable to give an entirely different result as applied to another kind of flour provided all other variables remain constant.

I have provided means whereby different flours (having reference specifically to wheat flour) can be blended so that a uniform product can be provided to insure that the period of fermentation for the dough batches made therefrom will be uniform. I have discovered a method whereby a uniform dough batch can be provided from day to day by making an analysis of the hydrogen ion concentration of the various flours and then combining them in appropriate proportions to provide a blended flour having a definite hydrogen ion concentration so that the required period of fermentation can be accurately determined provided all the other variables remain constant.

In carrying out the method to blend two flours, each flour is subjected to a hydrogen ion concentration test preferably by hydrogen electrode and then proper proportions of the two flours are blended together to give the hydrogen ion concentration desired.

For example, if the flour to be used in the dough batch is to show an initial hydrogen ion concentration of $.155 \times 10^{-5}$ and one of the flours shows a hydrogen ion concentration of $.852 \times 10^{-6}$ and the second flour shows a hydrogen ion concentration of $.226 \times 10^{-5}$, the two flours can be blended by bringing them together in the ratio one-to-one or two equal parts. The resultant test of the blend will show a hydrogen ion concentration of $.155 \times 10^{-5}$, which will be the resultant sought to be obtained and, knowing the definite hydrogen ion concentration of the flour to be introduced into the dough batch, definite calculation can be made for the required fermentation period to condition the dough. Therefore, the period of fermentation can be definitely controlled by combining the two flours in their proper proportions.

If a blend is to be made of four different flours, substantially the same process will be followed. For example, if the first flour shows a hydrogen ion concentration of $.921 \times 10^{-6}$, the second flour hydrogen ion concentration of $.308 \times 10^{-5}$, the third flour hydrogen ion concentration of $.217 \times 10^{-5}$ and the fourth shows hydrogen ion concentration of $.126 \times 10^{-5}$, the blend can be produced to show a hydrogen ion concentration of $.155 \times 10^{-5}$ by blending the flours in the following proportions: The first flour 29%, the second flour 11%, the third flour 20% and the fourth flour 40%, and the resultant product will show a hydrogen ion concentration of $.155 \times 10^{-5}$. Having found the correct period of time at a given temperature in which the dough batch will be most perfectly conditioned with a flour either natural or blended showing a hydrogen ion concentration of $.155 \times 10^{-5}$, it is obvious that the period of fermentation of the dough batch with any kind of flour can be controlled by properly blending the flours to show a hydrogen ion concentration of $.155 \times 10^{-5}$.

The above figures are simply illustrative because the baker may find that a different hydrogen ion concentration will be required for different purposes or different localities. The process of blending the flours, however, to fix the hydrogen ion concentration will be effected irrespective of variations in the results to be sought.

I have found it to be possible to determine the hydrogen ion concentration of the wheat before it is converted into flour and by proper proportioning or blending the wheat, the resultant flour will have a definite hydrogen ion concentration and when this is known, the period of fermentation of the dough batch can be easily determined.

In order to determine the hydrogen ion concentration of the wheat before it is converted into flour, the wheat is ground to a fine meal. Then ten grains of this wheaten are placed in a bottle containing 100 c. c. of water, free of carbon dioxide, and 1 c. c. of toluene is added to check fermentation. The bottle is closed and shaken for about thirty minutes, then the suspension is centrifuged and the hydrogen ion concentration of this decanted liquid determined. To determine the hydrogen ion concentration I prefer to use the hdyrogen electrode method as described in the publication entitled "Determinations of hydrogen ion" by W. Mansfield Clark, published 1920 by Williams and Wilkins Co., of Baltimore, Maryland.

After the determinations are obtained the percentages are determined mathematically; for example, as above described in connection with the flour. The calculations can then be checked by making the actual blend and applying the determination.

My invention also contemplates the blending of the mill streams from the breaking rolls in the mill and in applying the method to the mill streams, it is obvious that samples of the mill streams may be taken and analyzed for hydrogen ion concentration and that these streams can be properly proportioned to give a definite value so that the final flour will have the proper hydrogen ion concentration to insure a definite period of fermentation of the dough batch when the flour is being converted into bakery products.

In order to generically define the invention so as to include wheat in the berry, wheat products from the breaking rolls or the final flour, I will use the term "wheaten" as comprehending any form of wheat or wheat product in which it is desired to control the fermentation period during treatment either for the purpose of buying or selling wheat or any of the products or converting it into bakery products.

With the above method, the baker may buy wheat or flour with a definite knowledge of the kind of treatment required in converting it into bread and the miller may control his flour by blending the wheat, the mill streams or the flour itself so that he can sell to the baker with a definite assurance that the hydrogen ion concentration is of a given value.

What I claim and desire to secure by Letters-Patent is:

1. The step in the method of controlling the fermentation period of the dough batch for bakery products which consists in determining the hydrogen ion concentration in the flour and permitting the dough batch in which the flour is incorporated to continue for a period of time having a definite relation to the hydrogen ion concentration present.

2. The step in the process of controlling the period of fermentation of the dough batch in which all variables remain constant which consists in blending flours having different hydrogen ion concentration to obtain a blended flour having a determined hydrogen ion concentration to conform to a given time period during which the fermentation of the dough batch is to continue.

3. The method of providing a wheaten blend having a fixed and previously determined hydrogen ion concentration which consists in selecting wheaten from a plurality of sources, each having a different hydrogen ion concentration, and blending these in proper proportions.

In testimony wheref I affix my signature.

CHASTAIN G. HARREL.